US012574960B2

(12) United States Patent
Liu et al.

(10) Patent No.: US 12,574,960 B2
(45) Date of Patent: Mar. 10, 2026

(54) MAINTAINING CHANNEL OCCUPANCY TIME IN SIDELINK COMMUNICATION

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US)

( * ) Notice: Subject to any disclaimer, the term of this patent is extended or adjusted under 35 U.S.C. 154(b) by 540 days.

(21) Appl. No.: 17/710,642

(22) Filed: Mar. 31, 2022

(65) Prior Publication Data

US 2023/0319873 A1 Oct. 5, 2023

(51) Int. Cl.
*H04W 74/0808* (2024.01)
*H04W 74/02* (2009.01)

(52) U.S. Cl.
CPC ....... *H04W 74/0808* (2013.01); *H04W 74/02* (2013.01)

(58) Field of Classification Search
CPC ..... H04W 72/25; H04W 72/12; H04W 74/00; H04W 74/0808; H04W 74/02
See application file for complete search history.

(56) References Cited

U.S. PATENT DOCUMENTS

| | | | | |
|---|---|---|---|---|
| 11,671,281 | B1 | 6/2023 | Shrikhande et al. | |
| 12,302,123 | B2 * | 5/2025 | Ryu ....................... | H04W 16/28 |
| 2020/0177516 | A1 | 6/2020 | Thorstensen et al. | |
| 2020/0349345 | A1 | 11/2020 | Hodge et al. | |
| 2023/0064680 | A1 * | 3/2023 | Huang .................. | H04L 1/1848 |
| 2023/0146718 | A1 * | 5/2023 | Lei ........................ | H04L 1/1607 370/329 |
| 2023/0345529 | A1 * | 10/2023 | Van Phan ........... | H04W 74/002 |
| 2023/0396474 | A1 * | 12/2023 | Aldana ................. | H04W 72/23 |
| 2023/0413329 | A1 * | 12/2023 | Fouad ................... | H04W 72/25 |
| 2024/0064780 | A1 * | 2/2024 | Cheng ................... | H04W 72/40 |
| 2024/0137929 | A1 * | 4/2024 | Dong .................... | H04W 72/12 |
| 2024/0147532 | A1 * | 5/2024 | Zhao .................. | H04W 74/0816 |

(Continued)

FOREIGN PATENT DOCUMENTS

| | | | | | |
|---|---|---|---|---|---|
| CN | 114915390 | A | * | 8/2022 | |
| CN | 115380488 | A | * | 11/2022 | ........... H04L 1/1854 |
| WO | 2021208031 | A1 | | 10/2021 | |

OTHER PUBLICATIONS

Dahlman E., et al., "5G NR the Next Generation Wireless Access Technology, 2nd Edition, Chapters 18-27", In: "5G NR", Sep. 18, 2020, Elsevier, XP055908003, ISBN: 978-0-12-822320-8, pp. 1-611, p. 102, line 28-line 30, p. 457, line 1—p. 485, last line, 215 Pages, Sections 23.2, 23.3.1, 23.3.2, 23.4.1.3, 26.5.1, 26.5.2; figures 23.6, 23.7.

(Continued)

*Primary Examiner* — Chandrahas B Patel
*Assistant Examiner* — Andrew Shaji Kurian

(57) ABSTRACT

Disclosed are techniques for performing wireless communication. In some aspects, a first user equipment (UE) may determine that one or more physical sidelink feedback channel (PSFCH) instances are scheduled during a channel occupancy time (COT) corresponding to a sidelink transmission by the first UE to a second UE. In some examples, the first UE may transmit a COT maintenance signal during the one or more PSFCH instances, wherein at least one PSFCH symbol in the COT maintenance signal has a cyclic prefix extension.

24 Claims, 11 Drawing Sheets

800

Determine, At A First User Equipment (UE), That One Or More Physical Sidelink Feedback Channel (PSFCH) Instances Are Scheduled During A Channel Occupancy Time (COT) Corresponding To A Sidelink Transmission By The First UE To A Second UE
802

Transmit A COT Maintenance Signal During The One Or More PSFCH Instances, Wherein At Least One PSFCH Symbol In The COT Maintenance Signal Has A Cyclic Prefix Extension
804

(56)                    References Cited

U.S. PATENT DOCUMENTS

| | | | | |
|---|---|---|---|---|
| 2024/0224237 | A1* | 7/2024 | Ganesan | H04W 72/563 |
| 2024/0322983 | A1* | 9/2024 | Ijaz | H04W 74/0808 |
| 2024/0334534 | A1* | 10/2024 | Ko | H04W 76/28 |
| 2024/0357652 | A1* | 10/2024 | Chen | H04W 74/0816 |
| 2024/0397491 | A1* | 11/2024 | Khan Beigi | H04L 5/0051 |
| 2025/0039865 | A1* | 1/2025 | Liu | H04L 1/1858 |
| 2025/0080185 | A1* | 3/2025 | Bhamri | H04B 7/088 |

OTHER PUBLICATIONS

International Search Report and Written Opinion—PCT/US2023/063802—ISA/EPO—Jun. 1, 2023.

* cited by examiner

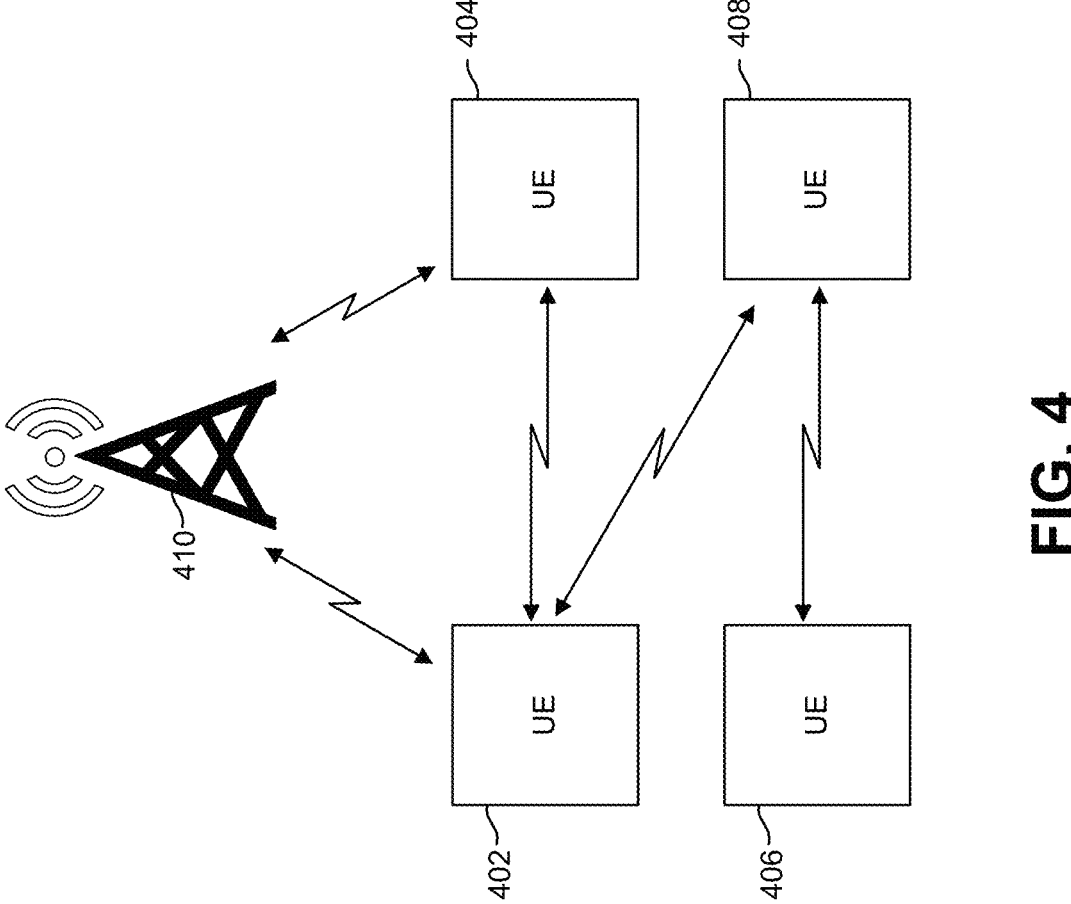
FIG. 4

800

Determine, At A First User Equipment (UE), That One Or More Physical Sidelink Feedback Channel (PSFCH) Instances Are Scheduled During A Channel Occupancy Time (COT) Corresponding To A Sidelink Transmission By The First UE To A Second UE
802

Transmit A COT Maintenance Signal During The One Or More PSFCH Instances, Wherein At Least One PSFCH Symbol In The COT Maintenance Signal Has A Cyclic Prefix Extension
804

FIG. 8

900

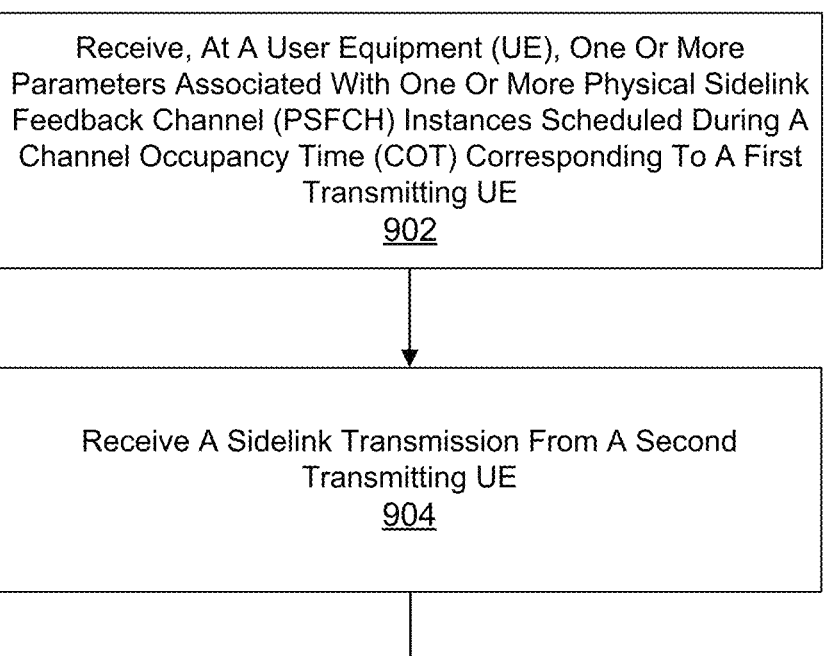

Receive, At A User Equipment (UE), One Or More Parameters Associated With One Or More Physical Sidelink Feedback Channel (PSFCH) Instances Scheduled During A Channel Occupancy Time (COT) Corresponding To A First Transmitting UE
902

Receive A Sidelink Transmission From A Second Transmitting UE
904

Transmit Feedback Corresponding To The Sidelink Transmission To The Second Transmitting UE During At Least One PSFCH Instance Of The One Or More PSFCH Instances Scheduled During The COT Corresponding To The First Transmitting UE
906

FIG. 9

MAINTAINING CHANNEL OCCUPANCY TIME IN SIDELINK COMMUNICATION

FIELD OF THE DISCLOSURE

Aspects of the present disclosure generally relate to wireless communication. In some aspects, examples are described for maintaining channel occupancy time (COT) in sidelink communication.

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a method is provided for wireless communication. The method may include: determining, at a first user equipment (UE), that one or more physical sidelink feedback channel (PSFCH) instances are scheduled during a channel occupancy time (COT) corresponding to a sidelink transmission by the first UE to a second UE; and transmitting a COT maintenance signal during the one or more PSFCH instances, wherein at least one PSFCH symbol in the COT maintenance signal has a cyclic prefix extension.

In another example, an apparatus for wireless communication is provided that includes at least one memory, at least one transceiver, and at least one processor (e.g., configured in circuitry) communicatively coupled to the at least one memory and the at least one transceiver. The at least one processor may be configured to: determine that one or more physical sidelink feedback channel (PSFCH) instances are scheduled during a channel occupancy time (COT) corresponding to a sidelink transmission by the apparatus to a user equipment (UE); and transmit, via the at least one transceiver, a COT maintenance signal during the one or more PSFCH instances, wherein at least one PSFCH symbol in the COT maintenance signal has a cyclic prefix extension.

In another example, a non-transitory computer-readable medium of a wireless communication device is provided that includes stored thereon at least one instruction that, when executed by one or more processors, may cause the one or more processors to: determine that one or more physical sidelink feedback channel (PSFCH) instances are scheduled during a channel occupancy time (COT) corresponding to a sidelink transmission to a user equipment (UE); and transmit a COT maintenance signal during the one or more PSFCH instances, wherein at least one PSFCH symbol in the COT maintenance signal has a cyclic prefix extension.

In another example, an apparatus for wireless communication is provided. The apparatus may include: means for determining that one or more physical sidelink feedback channel (PSFCH) instances are scheduled during a channel occupancy time (COT) corresponding to a sidelink transmission by the apparatus to a user equipment (UE); and means for transmitting a COT maintenance signal during the one or more PSFCH instances, wherein at least one PSFCH symbol in the COT maintenance signal has a cyclic prefix extension.

In another example, a method for wireless communication is provided. The method may include: receiving, at a user equipment (UE), one or more parameters associated with one or more physical sidelink feedback channel (PSFCH) instances scheduled during a channel occupancy time (COT) corresponding to a first transmitting user equipment (UE); receiving a sidelink transmission from a second transmitting UE; and transmitting feedback corresponding to the sidelink transmission to the second transmitting UE during at least one PSFCH instance of the one or more PSFCH instances scheduled during the COT corresponding to the first transmitting UE.

In another example, an apparatus for wireless communication is provided that includes at least one memory, at least one transceiver, and at least one processor (e.g., configured in circuitry) communicatively coupled to the at least one memory and the at least one transceiver. The at least one processor may be configured to: receive, via the at least one transceiver, one or more parameters associated with one or more physical sidelink feedback channel (PSFCH) instances scheduled during a channel occupancy time (COT) corresponding to a first transmitting user equipment (UE); receive, via the at least one transceiver, a sidelink transmission from a second transmitting UE; and transmit, via the at least one transceiver, feedback corresponding to the sidelink transmission to the second transmitting UE during at least one PSFCH instance of the one or more PSFCH instances scheduled during the COT corresponding to the first transmitting UE.

In another example, a non-transitory computer-readable medium is provided that includes stored thereon at least one instruction that, when executed by one or more processors, may cause the one or more processors to: receive one or more parameters associated with one or more physical sidelink feedback channel (PSFCH) instances scheduled during a channel occupancy time (COT) corresponding to a first transmitting user equipment (UE); receive a sidelink transmission from a second transmitting UE; and transmit feedback corresponding to the sidelink transmission to the second transmitting UE during at least one PSFCH instance of the one or more PSFCH instances scheduled during the COT corresponding to the first transmitting UE.

In another example, an apparatus for wireless communication is provided. The apparatus may include: means for receiving one or more parameters associated with one or more physical sidelink feedback channel (PSFCH) instances scheduled during a channel occupancy time (COT) corresponding to a first transmitting user equipment (UE); means for receiving a sidelink transmission from a second transmitting UE; and means for transmitting feedback corresponding to the sidelink transmission to the second transmitting UE during at least one PSFCH instance of the one or more PSFCH instances scheduled during the COT corresponding to the first transmitting UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 4 is a diagram illustrating an example wireless communication system for maintaining channel occupancy time (COT) in sidelink communication, according to aspects of the disclosure.

FIG. 8 is a flow diagram illustrating an example of a process for maintaining COT in sidelink communication, according to aspects of the disclosure.

FIG. 9 is a flow diagram illustrating another example of a process for maintaining COT in sidelink communication, according to aspects of the disclosure.

DETAILED DESCRIPTION

Figure 1:
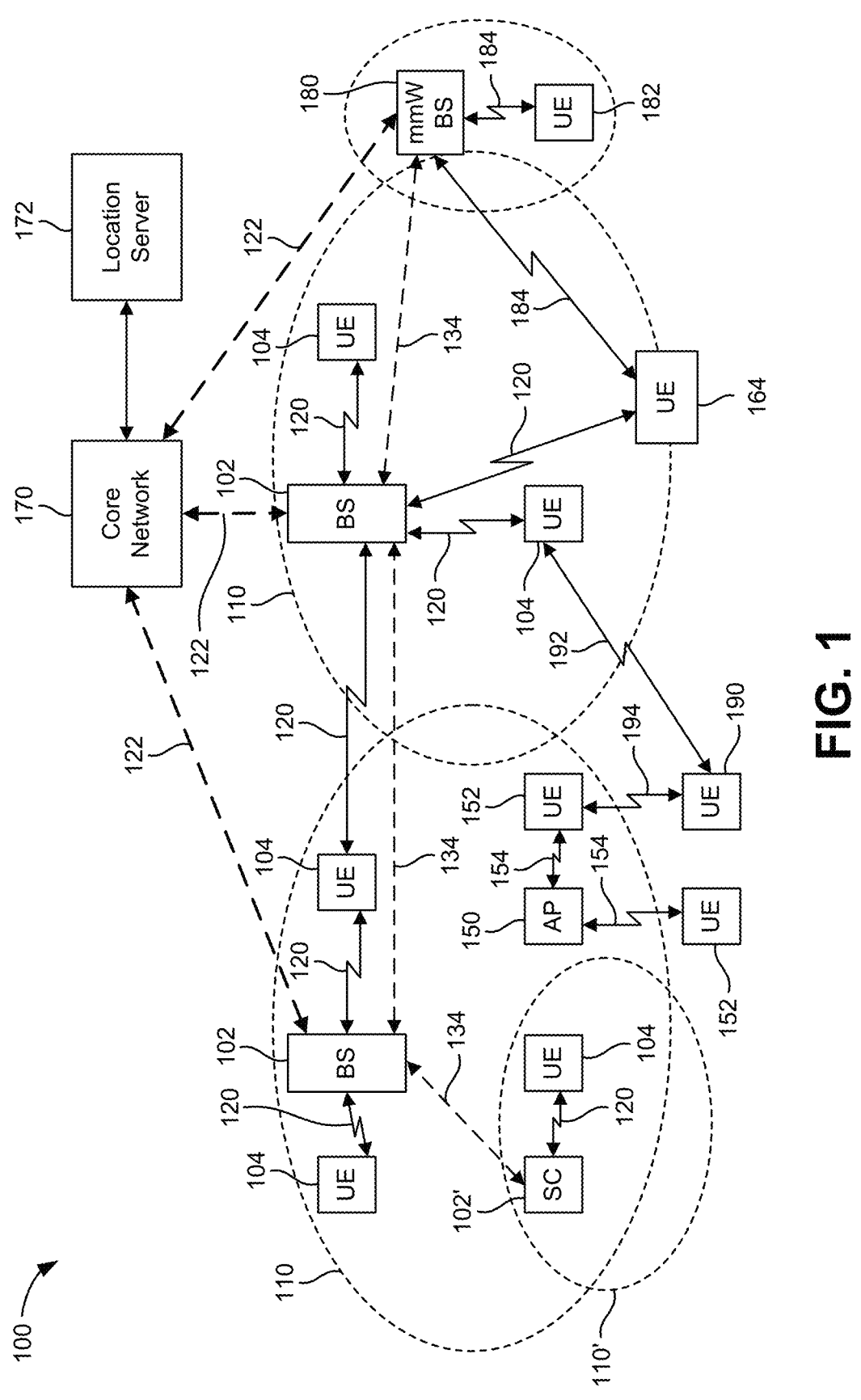
FIG. 1 illustrates an exemplary wireless communications system, according to aspects of the disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services such as voice, video, packet data, messaging, broadcast, and the like. A wireless communication network may support both access links and sidelinks for communication between wireless devices. An access link may refer to any communication link between a client device (e.g., a user equipment (UE), a Wi-Fi station (STA), or other client device) and a base station (e.g., a 3GPP gNB, a 3GPP eNB, a Wi-Fi access point (AP), or other base station). For example, an access link may support uplink signaling, downlink signaling, connection procedures, etc.

A sidelink may refer to any communication link between client devices (e.g., UEs, STAB, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 gigahertz (GHz) or 6 GHz). As used herein, the term sidelink may refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some cases, a first UE may obtain channel transmission resources (e.g., channel occupancy time (COT)) for transmitting sidelink communications to a second UE. For example, the first UE may determine that a channel is available for transmission by implementing one or more listen-before-talk algorithms. In some aspects, a COT may include one or more sidelink frames in a shared frequency band that the first UE may use to transmit one or more transport blocks (TBs).

In some aspects, the first UE (e.g., transmitting UE) may be configured to transmit a continuous data burst within a single COT. In some cases, the transmitting UE may lose the COT (e.g., in the middle of the data transmission) if there is a gap in transmission. In some cases, a gap in transmission may occur when one or more physical sidelink feedback channel (PSFCH) instances are scheduled within the COT and the transmitting UE does not have any feedback to transmit (e.g., the transmitting UE transition to receive mode for a threshold time that interrupts the COT).

Systems, apparatuses, processes (also referred to as methods), and computer-readable media (collectively referred to as "systems and techniques") are described herein for maintaining channel occupancy time (COT) in sidelink communication. The systems and techniques provide the ability for a transmitting user equipment (UE) to initiate and maintain a COT that may include one or more physical sidelink feedback channel (PSFCH) instances by using a COT maintenance signal. The systems and techniques also provide the ability for the UE to synchronize the COT maintenance signal with one or more PSFCH transmissions from other UEs that share the same PSFCH instance.

In some aspects, the COT maintenance signal may include feedback data corresponding to a sidelink reception. In some cases, in which feedback data is not available, the COT maintenance signal may include filler or padding data that may mimic a PSFCH signal. In some examples, the COT maintenance signal may be transmitted using PSFCH resources that do not interfere with PSFCH resources used by other UEs. For example, a transmitting UE may identify PSFCH resources for the COT maintenance signal based on a transmitter identifier. In another example, a transmitting UE may select PSFCH resource for the COT maintenance signal from a set of reserved PSFCH resources that are excluded from the PSFCH resource pool. In some aspects, the PSFCH resources may include a PSFCH resource block group or a PSFCH interlace. In some examples, the transmitting UE may select a PSFCH format for the COT maintenance signal (e.g., PSFCH format 0 length-12 sequence with cyclic shift ramping; PSFCH format 2 OFDM waveform with orthogonal cover code (OCC); etc.)

In some examples, the COT maintenance signal may be implemented using a cyclic prefix extension (CPE) that is configured to fill a transmission gap within a PSFCH symbol (e.g., CPE may be used to reduce transmission gap to less than 16 μs or to less than 25 μs). In some aspects, a transmitting UE may transmit the COT maintenance signal (e.g., with CPE) to avoid transmission gaps that would interrupt the COT and necessitate further LBT to clear the channel.

In some aspects, the COT maintenance signal may be associated with one or more signal parameters. In some examples, the one or more signal parameters may include an LBT type, one or more CPE parameters, a priority class, a COT duration, a COT start time, a resource block (RB) set bitmap, etc. In some cases, the transmitting UE may share the one or more parameters with other UEs (e.g., using sidelink control information (SCI) or COT system information (COT-SI). In some aspects, the other UEs may use the signal parameters to configure (e.g., align) PSFCH signal transmissions that may share the PSFCH instance with the COT maintenance signal. For example, a receiving UE may transmit a PSFCH signal with hybrid automatic request (HARQ) feedback during the same PSFCH instance as the COT maintenance signal.

Additional aspects of the present disclosure are described in more detail below.

As used herein, the term "communication unit" is a system, device, or component of a UE (e.g., a vehicle, a user device, etc.) and/or other device (e.g., a road side unit (RSU) or other device) that may include a telematics control unit (TCU), a network access device (NAD), a modem, a subscriber identity module (SIM), a transceiver (or individual receiver and/or transmitter), any combination thereof, and/or other system, device, or component configured to perform wireless communication operations.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a radio access network (RAN) and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
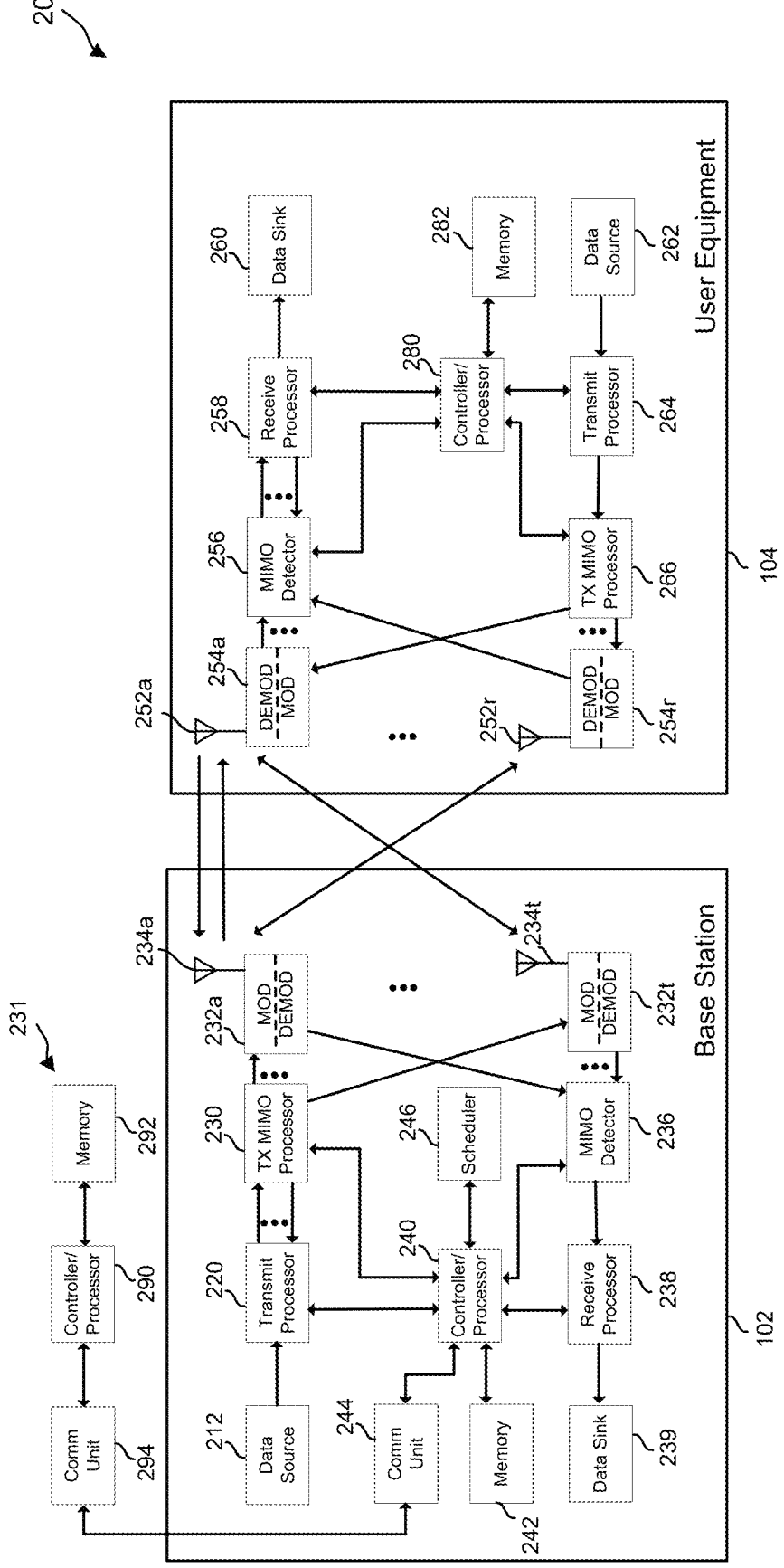
FIG. 2A is a diagram illustrating a design of a base station and a User Equipment (UE) that enable transmission and processing of signals exchanged between the UE and the base station, according to aspects of the disclosure.

FIG. 2A shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2A may perform one or more techniques associated with maintaining channel occupancy time (COT) in sidelink communication.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 2B:
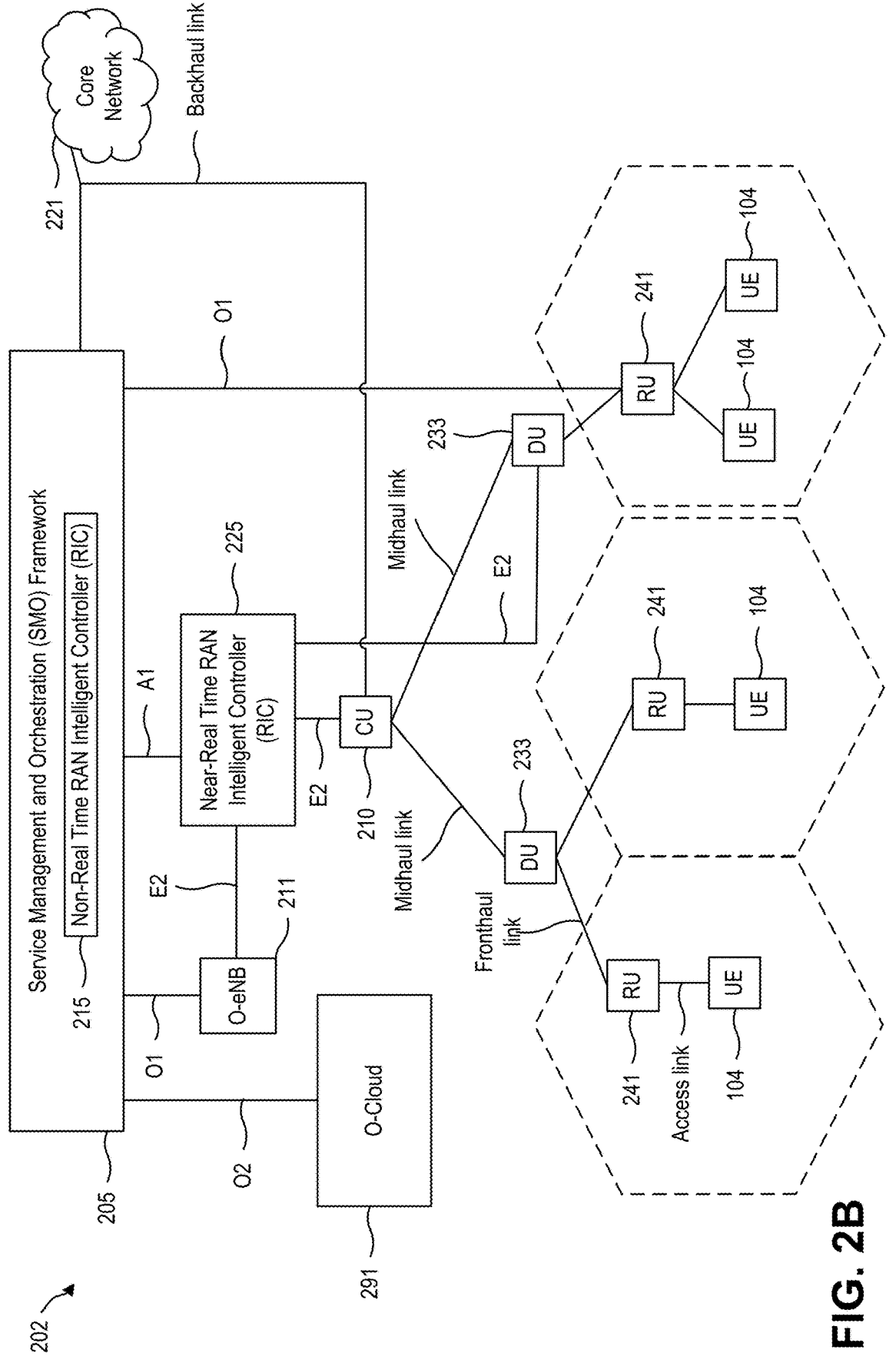
FIG. 2B is a diagram illustrating an example of a disaggregated base station, according to aspects of the disclosure.

FIG. 2B shows a diagram illustrating an example disaggregated base station 202 architecture. The disaggregated base station 202 architecture may include one or more central units (CUs) 210 that may communicate directly with a core network 221 via a backhaul link, or indirectly with the core network 221 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 233 via respective midhaul links, such as an F1 interface. The DUs 233 may communicate with one or more radio units (RUs) 241 via respective fronthaul links. The RUs 241 may communicate with respective UEs 104 via one or more radio frequency (RF) access links. In some implementations, the UE 104 may be simultaneously served by multiple RUs 241.

Each of the units, e.g., the CUs 210, the DUs 233, the RUs 241, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 may be logically split into one or more CU-UP units and one or more CU-CP units. The CU-UP unit may communicate bidirectionally with the CU-CP unit via an interface, such as the E1 interface when implemented in an O-RAN configuration. The CU 210 may be implemented to communicate with the DU 233, as necessary, for network control and signaling.

The DU 233 may correspond to a logical unit that includes one or more base station functions to control the operation of one or more RUs 241. In some aspects, the DU 233 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 233 may further host one or more low PHY layers. Each layer (or module) may be implemented with an interface configured to communicate signals with other layers (and modules) hosted by the DU 233, or with the control functions hosted by the CU 210.

Lower-layer functionality may be implemented by one or more RUs 241. In some deployments, an RU 241, controlled by a DU 233, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241 may be implemented to handle over the air (OTA) communication with one or more UEs 104. In some implementations, real-time and non-real-time aspects of control and user plane communication with the RU(s) 241 may be controlled by the corresponding DU 233. In some scenarios, this configuration may enable the DU(s) 233 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 291) to perform network element life cycle management (such as to instantiate virtualized network elements) via a cloud computing platform interface (such as an O2 interface). Such virtualized network elements may include, but are not limited to, CUs 210, DUs 233, RUs 241 and Near-RT RICs 225. In some implementations, the SMO Framework 205 may communicate with a hardware aspect of a 4G RAN, such as an open eNB (O-eNB) 211, via an O1 interface. Additionally, in some implementations, the SMO Framework 205 may communicate directly with one or more RUs 241 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 233, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
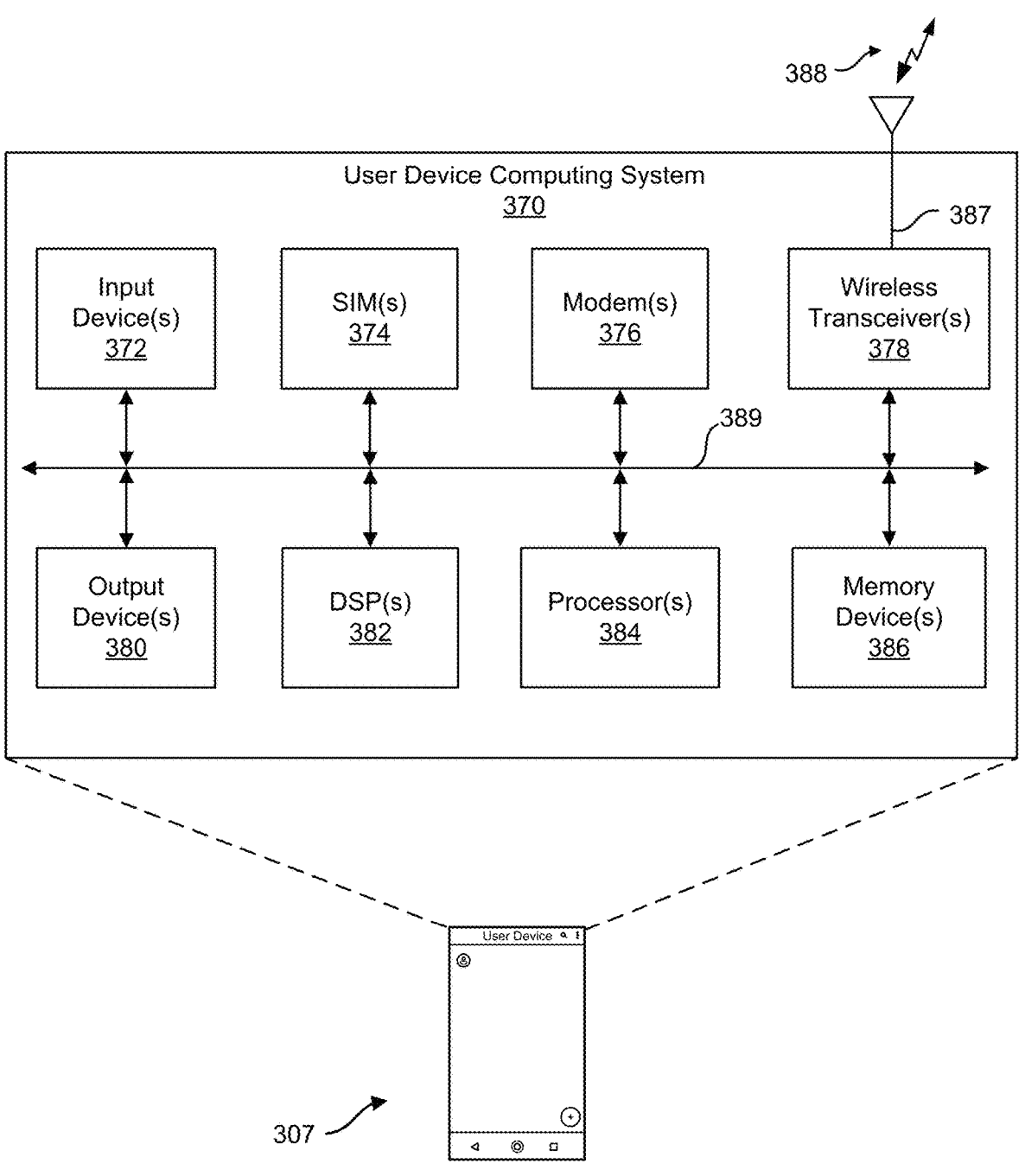
FIG. 3 is a block diagram illustrating an example of a computing system of a user device, according to aspects of the disclosure.

FIG. 3 illustrates an example of a computing system 370 of a wireless device 307. The wireless device 307 may include a client device such as a UE (e.g., UE 104, UE 152, UE 190) or other type of device (e.g., a Wi-Fi station (STA) configured to communicate using a Wi-Fi interface) that may be used by an end-user. Wireless device 307 may also include network devices (e.g., base stations such as eNBs and/or gNBs, Wi-Fi access points (APs) such as routers, range extenders or the like, etc.). For example, the wireless device 307 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 370 includes software and hardware components that may be electrically or communicatively coupled via a bus 389 (or may otherwise be in communication, as appropriate). For example, the computing system 370 includes one or more processors 384. The one or more processors 384 may include one or more CPUs, ASICs, FPGAs, APs, GPUs, VPUs, NSPs, microcontrollers, dedicated hardware, any combination thereof, and/or other processing device or system. The bus 389 may be used by the one or more processors 384 to communicate between cores and/or with the one or more memory devices 386.

The computing system 370 may also include one or more memory devices 386, one or more digital signal processors (DSPs) 382, one or more SIMs 374, one or more modems 376, one or more wireless transceivers 378, an antenna 387, one or more input devices 372 (e.g., a camera, a mouse, a keyboard, a touch sensitive screen, a touch pad, a keypad, a microphone, and/or the like), and one or more output devices 380 (e.g., a display, a speaker, a printer, and/or the like).

In some aspects, computing system 370 may include one or more radio frequency (RF) interfaces configured to transmit and/or receive RF signals. In some examples, an RF interface may include components such as modem(s) 376, wireless transceiver(s) 378, and/or antennas 387. The one or more wireless transceivers 378 may transmit and receive wireless signals (e.g., signal 388) via antenna 387 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 370 may include multiple antennas or an antenna array that may facilitate simultaneous transmit and receive functionality. Antenna 387 may be an omnidirectional antenna such that radio frequency (RF) signals may be received from and transmitted in all directions. The wireless signal 388 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 388 may be transmitted directly to other wireless devices using sidelink communications (e.g., using a PC5 interface, using a DSRC interface, etc.). Wireless transceivers 378 may be configured to transmit RF signals for performing sidelink communications via antenna 387 in accordance with one or more transmit power parameters that may be associated with one or more regulation modes. Wireless transceivers 378 may also be configured to receive sidelink communication signals having different signal parameters from other wireless devices.

In some examples, the one or more wireless transceivers 378 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 388 into a baseband or intermediate frequency and may convert the RF signals to the digital domain.

In some cases, the computing system 370 may include a coding-decoding device (or CODEC) configured to encode and/or decode data transmitted and/or received using the one or more wireless transceivers 378. In some cases, the computing system 370 may include an encryption-decryption device or component configured to encrypt and/or decrypt data (e.g., according to the AES and/or DES standard) transmitted and/or received by the one or more wireless transceivers 378.

The one or more SIMs 374 may each securely store an international mobile subscriber identity (IMSI) number and related key assigned to the user of the wireless device 307. The IMSI and key may be used to identify and authenticate the subscriber when accessing a network provided by a network service provider or operator associated with the one or more SIMs 374. The one or more modems 376 may modulate one or more signals to encode information for transmission using the one or more wireless transceivers 378. The one or more modems 376 may also demodulate signals received by the one or more wireless transceivers 378 in order to decode the transmitted information. In some examples, the one or more modems 376 may include a Wi-Fi modem, a 4G (or LTE) modem, a 5G (or NR) modem, and/or other types of modems. The one or more modems 376 and the one or more wireless transceivers 378 may be used for communicating data for the one or more SIMs 374.

The computing system 370 may also include (and/or be in communication with) one or more non-transitory machine-readable storage media or storage devices (e.g., one or more memory devices 386), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 386 and executed by the one or more processor(s) 384 and/or the one or more DSPs 382. The computing system 370 may also include software elements (e.g., located within the one or more memory devices 386), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 307 may include means for performing operations described herein. The means may include one or more of the components of the computing system 370. For example, the means for performing operations described herein may include one or more of input device(s) 372, SIM(s) 374, modems(s) 376, wireless transceiver(s) 378, output device(s) (380), DSP(s) 382, processors (384), memory device(s) 386, and/or antenna(s) 387.

As noted previously, systems and techniques are described herein for maintaining channel occupancy time (COT) in sidelink communication. FIG. 4 is a diagram illustrating an example wireless communications system 400 for maintaining COT in sidelink communication. While the system 400 is described using user equipment (UE) and base stations (BSs) as illustrative examples, the techniques described with respect to the system 400 may be performed by Wi-Fi stations (STA) and access points (APs) or by other devices that communicate using other communication protocols.

In some examples, system 400 may include one or more user equipment (UE) devices, such as UE 402, UE 404, UE 406 and UE 408. As noted with respect to FIG. 1, a UE may include and/or be referred to as an access terminal, a user device, a user terminal, a client device, a wireless device, a subscriber device, a subscriber terminal, a subscriber station, a mobile device, a mobile terminal, a mobile station, or variations thereof. In some aspects, a UE may include a mobile telephone or so-called "smart phone", a tablet computer, a wearable device, an extended reality device (e.g., a virtual reality (VR) device, an augmented reality (AR) device, or a mixed reality (MR) device), a personal computer, a laptop computer, an internet of things (IoT) device, a television, a vehicle (or a computing device of a vehicle), or any other device having a radio frequency (RF) interface.

In some aspects, the system 400 may include a base station such as base station 410. In some cases, base station 410 may include macro cell base stations and/or small cell base stations, as described in connection with system 100 (e.g., base stations 102). In other aspects, base station 410 may include a wireless access point, such as, for example, AP 150 described in connection with system 100. In some aspects, UE 402 and UE 404 may communicate with base station 410 in uplink (UL) and/or downlink (DL) directions. DL refers to the transmission direction from base station 410 to a UE, and UL refers to the transmission direction from a UE (e.g., UE 402, UE 404) to base station 410.

In some examples, one or more of the UEs may utilize sidelink communications to communicate directly with each other. As illustrated, UE 402 and UE 404 may communicate via sidelink, UE 406 and UE 408 may communicate via sidelink, and UE 402 and UE 408 may communicate via sidelink. In some examples, the UEs (e.g., UE 402, UE 404, UE 406, and/or UE 408) may be configured to perform sidelink communications using a mode (e.g., mode 1) in which base station 410 may assign and manage the sidelink radio resources. In some cases, base station 410 may allocate radio resources for sidelink communications based on dynamic grant (DG) scheduling, in which a UE requests resources for transmission of a transport block (TB). For instance, UE 402 may send a scheduling request to base station 410 (e.g., using Physical Uplink Control Channel (PUCCH)). The base station 410 may respond with an indication of the sidelink resources (e.g., slot(s), sub-channel (s), etc.) allocated for the sidelink transmission of the TB. In some cases, the base station 410 may provide the indication of the sidelink resources using the Downlink Control Information (DCI) transmitted over the Physical Downlink Control Channel (PDCCH).

In some instances, base station 410 may allocate radio resources for sidelink communications based on configured grant (CG) scheduling. For instance, UE 402 and/or UE 404 may send a message to base station 410 indicating information about the sidelink transmission (e.g., periodicity of TBs, TB maximum size, Quality of Service (QoS) information, etc.) and base station 410 may allocate a CG that satisfies the UE requirements. In some examples, the CG allocation of sidelink resources (e.g., slot(s), sub-channels, etc.) may be provided to a UE using radio resource control (RRC) signaling.

In some examples, the UEs (e.g., UE 402, UE 404, UE 406, and/or UE 408) may be configured to perform sidelink communications using a mode (e.g., mode 2) in which a UE may autonomously select sidelink radio resources. In some aspects, mode 2 of sidelink communications may be implemented outside of a coverage area associated with base station 410. In some examples, the UEs may select radio resources (e.g., frame(s), sub-carrier(s), etc.) for sidelink communications from a resource pool. In some cases, the resource pool for performing sidelink communications autonomously may be pre-configured by a base station (e.g., base station 410) when a respective UE is associated with the base station.

In some aspects, the UEs (e.g., UE 402, UE 404, UE 406, and/or UE 408) may be configured to provide feedback in response to a sidelink communication. In some examples, the feedback may correspond to hybrid automatic request (HARQ) feedback. In some cases, the HARQ feedback may include an acknowledgment (ACK) and/or a negative acknowledgment (NACK). In some aspects, the feedback may be provided using a Physical Sidelink Feedback Channel (PSFCH). In some aspects, different PSFCH formats may be configured to transmit different payload sizes (e.g., number of symbols, number of resource blocks, etc.). In some cases, a PSFCH format may be selected based on reliability requirements associated with the HARQ feedback.

In some instances, the feedback in the PSFCH may be provided using an interlaced PSFCH format in which each PSFCH may occupy one interlace in a resource block (RB) set. For example, the UEs (e.g., UE 402, UE 404, UE 406, and/or UE 408) may use an interlace PSFCH format 0 (PF0) waveform having a sequence (e.g., a length 12 sequence) per RB that may be copied to each interlace (e.g., 10 or 11 RBs) within the RB set. In some examples, the UEs may apply a cyclic shift to indicate ACK or NACK. In some cases, the interlace PF0 waveform with cyclic shift may be used to reduce peak-to-average power ratio (PAPR) of a PSFCH transmission.

In some cases, the UEs (e.g., UE 402, UE 404, UE 406, and/or UE 408) may support a PSFCH format capable of conveying multi-bit feedback. For example, the UEs may use an interlace PSFCH format 2 (PF2) waveform. In some cases, the interlace PF2 waveform may correspond to an orthogonal frequency division multiplexing (OFDM) waveform that uses all RBs in the RB set and may include a demodulation reference signal (DMRS) (e.g., every 3 resource elements). In some examples, the interlace PF2 waveform may be implemented with an orthogonal cover code (e.g., OCC2 or OCC4) to improve user multiplexing. In some cases, the interlace PF2 waveform may support HARQ codebook (CB) (e.g., CB type 1, CB type 2, CB type 3, etc.) for providing feedback using a dynamic slot offset (e.g., "K1" offset). For instance, the K1 offset included in sidelink control information (SCI) may indicate an offset between the slot where data is scheduled on a physical sidelink shared channel (PSSCH) and the slot where PSFCH feedback is sent (e.g., HARQ CB).

Figure 5:
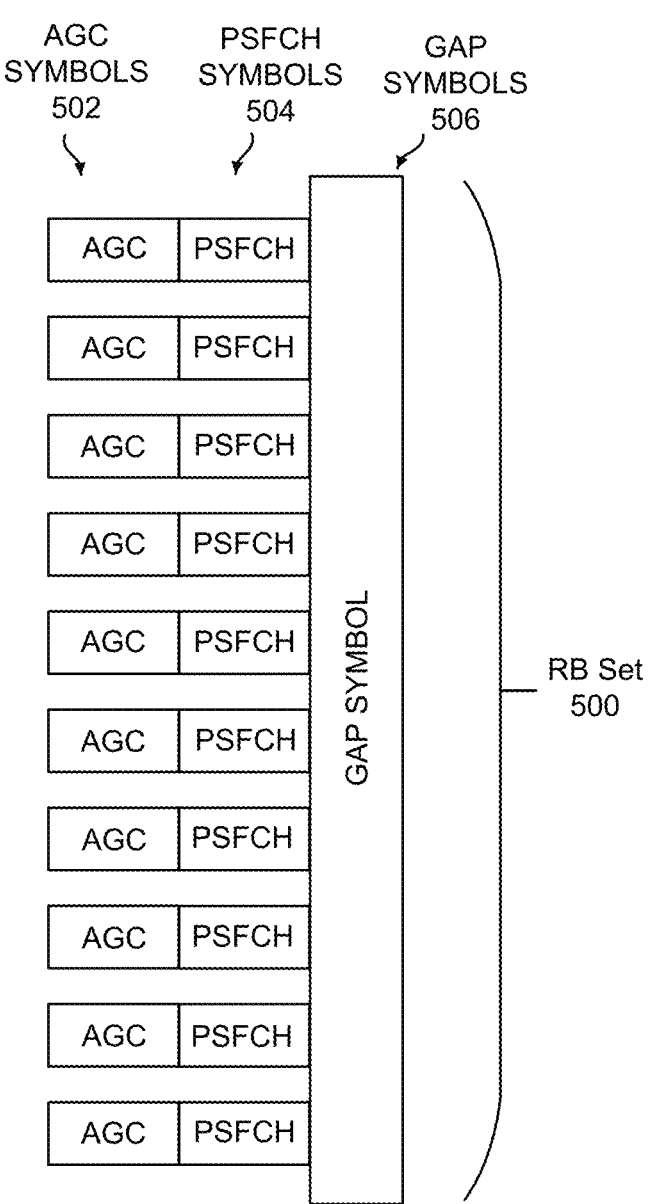
FIG. 5 is a diagram illustrating an example resource block set, according to aspects of the disclosure.

FIG. 5 is a diagram illustrating an example resource block (RB) set 500. In some aspects, RB set 500 may include an interlaced resource allocation for transmitting a PSFCH waveform. In some examples, the interlaced resource allocation may include 10 equally spaced RBs that correspond to different sub-carriers. In one example, the RBs in RB set 500 may be equally spaced within a 20 MHz frequency bandwidth for 15 KHz sub-carrier spacing.

In some aspects, RB set 500 may be used to transmit a PSFCH waveform (e.g., interlace PF0, interlace PF2, and/or any other suitable PSFCH format) using interlaced RBs. As illustrated, RB set 500 includes 10 RBs corresponding to PSFCH symbols 502 and 10 RBs corresponding to the automatic gain control (AGC) symbols 504. In some cases, RB set 500 may also include gap symbols 506 (e.g., guard symbols) that may correspond to the last symbol in a slot that includes a PSFCH transmission.

Returning to FIG. 4, in some cases, a transmitting UE (e.g., UE 402) may obtain channel transmission resources by performing a listen-before-talk (LBT) algorithm (e.g., an LBT category (CAT) for sensing a channel) in order to acquire or initiate a channel occupancy time (COT). In some aspects, a COT may include one or more sidelink frames in a shared frequency band that may be used by UE 402, UE 404, UE 406, and/or UE 408 for sidelink communications. In some cases, UE 402 may implement category CAT 1-LBT in which UE 402 may access the channel without performing LBT (e.g., gap or channel idle time is less than 16 µs). In some examples, UE 402 may implement CAT 2-LBT (e.g., Type 2A and/or Type 2B) by sensing the channel for a fixed time duration. In some aspects, UE 402 may access the channel if the channel remains idle for 25 µs (e.g., implementing Type 2A CAT 2-LBT). In some instances, UE 402 may access the channel if the channel remains idle for 16 µs (e.g., implementing Type 2B CAT 2-LBT).

In some aspects, UE 402 may initiate a COT (e.g., after performing LBT) for transmitting multiple transport blocks (TBs). In one illustrative example, UE 402 may be configured to transmit multiple TBs in a single COT when implementing an enhanced mobile broadband (eMBB) application (e.g., to avoid LBT overhead). In some cases, UE 402 may continuously transmit (e.g., PSSCH transmissions) in order to maintain a COT that includes multiple TBs. In some configurations, UE 402 may need to initiate a new COT (e.g., repeat LBT procedure) when there is a transmission gap. For example, a transmission gap greater than 25 µs may cause UE 402 to lose the COT.

In some aspects, a PSFCH instance may be scheduled (e.g., based on PSFCH period) within a COT corresponding to UE 402. In some cases, the COT may be interrupted if UE 402 does not transmit during the PSFCH instance. For example, UE 402 may switch from a transmit mode to a receive mode if UE 402 is not transmitting HARQ feedback using the PSFCH instance within the COT. In some instances, UE 402 may lose access to the channel (e.g., COT may be interrupted) due to a time gap that exceeds a threshold value (e.g., 25 µs) in which UE 402 is not transmitting.

In some examples, UE 402 may maintain the COT by transmitting a COT maintenance signal during the PSFCH instances that occur within the COT. In some aspects, the COT maintenance signal may correspond to a PSFCH waveform for the COT initiator (e.g., UE 402) to fill the PSFCH gaps and/or PSFCH symbols in order to maintain the COT throughout the scheduled data burst (e.g., multiple TBs). For instance, the COT maintenance signal may be a PSFCH signal that uses reserved and/or unused PSFCH resources. In some aspects, the COT maintenance signal may correspond to a PSFCH transmission that includes HARQ feedback from UE 402 (e.g., UE 402 is scheduled to transmit Ack/Nack feedback to another UE during the PSFCH instance). In some cases, the COT maintenance signal may be implemented using a cyclic prefix extension (CPE) that is configured to fill a transmission gap within a PSFCH symbol (e.g., CPE may be used to reduce transmission gap to less than 16 µs or to less than 25 µs).

In some cases, the COT maintenance signal may be aligned with one or more PSFCH transmissions made by other UEs (e.g., simultaneous PSFCH transmissions by UEs that may or may not be addressed by the COT initiating UE). For example, a COT maintenance signal transmitted by UE 402 may need to be aligned with PSFCH transmissions from UE 404 (e.g., UE 404 is addressed by UE 402) as well as PSFCH transmissions from UE 406 and/or UE 408 (e.g., UE 406 and UE 408 not addressed by UE 402). In some configurations, UE 402 may broadcast one or more parameters associated with the COT maintenance signal. In some examples, the one or more parameters may include an LBT type, one or more CPE parameters, a priority class, a COT duration, a COT start time, a resource block (RB) set bitmap, etc. In some cases, UE 404, UE 406, and/or UE 408 may use the one or more parameters associated with the COT maintenance signal from UE 402 to simultaneously transmit a respective PSFCH transmission.

Figure 6:
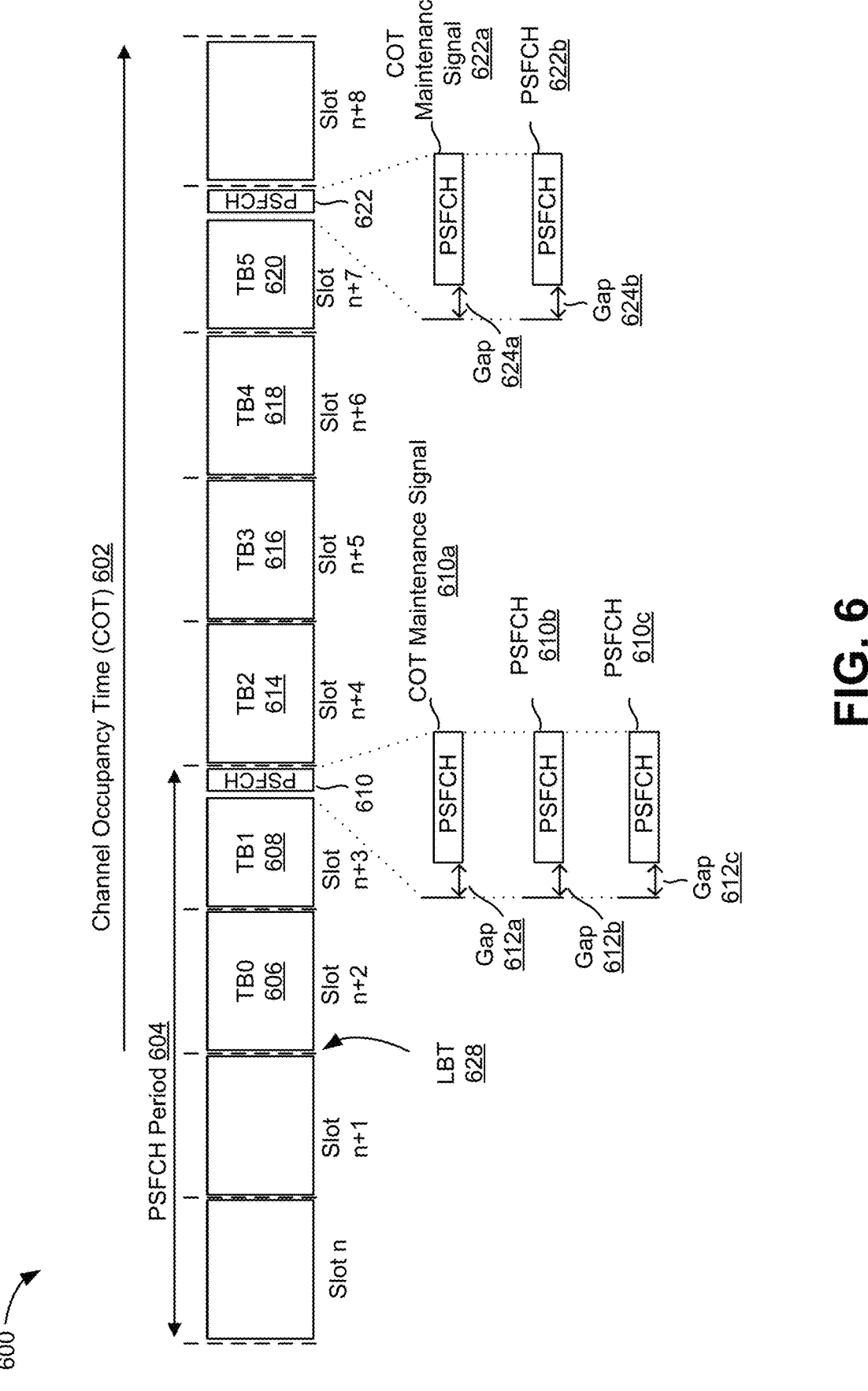
FIG. 6 is a diagram illustrating an example of COT maintenance in sidelink communication, according to aspects of the disclosure.

FIG. 6 is a diagram illustrating an example of COT maintenance for sidelink communication 600. In some aspects, UE 402 may perform LBT 628 to clear the channel and initiate COT 602 for transmitting a sidelink communication to UE 404 For example, UE 402 may determine that the channel is available for initiating COT 602 because no other UEs are transmitting during slot n and/or slot n+1. In some cases, COT 602 may begin at slot n+2, and COT 602 may end at slot n+8 (e.g., COT 602 may include 7 slots). In some examples, UE 402 may transmit multiple transport blocks (TBs) during COT 602 (e.g., UE 402 may transmit TB0 606, TB1 608, TB2 614, TB3 616, TB4 618, and TB5 620).

In some examples, sidelink communication 600 may include one or more PSFCH instances (e.g., PSFCH instance 610 and PSFCH instance 622) that may be scheduled based on PSFCH period 604 (e.g., every 1 slot, every 2 slots, every 4 slots, etc.). For instance, PSFCH period 604 may be set to a value of 4 such that a PSFCH instance is scheduled every 4 slots. In some cases, PSFCH instance 610 may be scheduled within slot n+3 (e.g., within same slot as transmission of TB1 608) and a subsequent PSFCH instance 622 may be scheduled within slot n+7 (e.g., within same slot as transmission of TB5 620).

In some aspects, COT 602 may be interrupted if UE 402 does not transmit during PSFCH instance 610 and/or PSFCH instance 622. In some cases, a transmission gap that exceeds a threshold value (e.g., 25 µs) may cause UE 402 to repeat LBT to initiate a new COT. In some examples, initiating a new COT may result in degraded performance due to the delay in performing LBT.

In some examples, UE 402 may maintain COT 602 by transmitting COT maintenance signal 610a during PSFCH instance 610 and/or by transmitting COT maintenance signal 622a during PSFCH instance 622. In some cases, COT maintenance signal 610a and/or COT maintenance signal 622a may include HARQ feedback (e.g., ACK/NACK) that is transmitted to the receiving UE (e.g., UE 402 may transmit HARQ feedback to UE 404 corresponding to a prior transmission received from UE 404). In some examples, COT maintenance signal 610a and/or COT maintenance signal 622a may be implemented using cyclic prefix extension (CPE). For example, COT maintenance signal 610a may be implemented using a CPE that is configured to fill all or a portion of gap 612a with an extended PSFCH symbol (e.g., CPE may be used to reduce gap 612a to less than 16 µs or to less than 25 µs).

In some aspects, the COT initiating UE (e.g., UE 402) may not have any HARQ feedback to transmit to the receiving UE (e.g., UE 404). In some cases, COT maintenance signal 610a and/or COT maintenance signal 622a may include padding data or filler data that may be transmitted using PSFCH resources that do not interfere with resources used by other UEs. For example, the PSFCH resources used by UE 402 to transmit COT maintenance signal 610a and/or COT maintenance signal 622a may be orthogonal to PSFCH resources used by UE 404, UE 406, and/or UE 408.

In some cases, UE 402 may select PSFCH resources for COT maintenance signal 610a and/or COT maintenance signal 622a based on a transmitter identifier (e.g., an L1 ID) that is associated with UE 402. In one illustrative example, PSFCH resources for the COT maintenance signal may be determined based on equation (1) below, in which $P_{ID}$ is the transmitter ID, $M_{ID}$ is the groupcast ID (e.g., may be set to 0 in some cases), and $R_{PRB,CS}^{PSFCH}$ is the PSFCH resource pool size, as follows:

$$(P_{ID}+M_{ID})\bmod R_{PRB,CS}^{PSFCH} \tag{1}$$

In some aspects, COT maintenance signal 610a and/or COT maintenance signal 622a may use all or a portion of the PSFCH resources that are based on the transmitter ID. In some examples, UE 402 may select (e.g., randomly) a PSFCH RB group or a PSFCH interlace. In some cases, UE 402 may select a fixed RB group or PSFCH interlace. In some cases, the COT maintenance signal (e.g., COT maintenance signal 610*a* and/or COT maintenance signal 622*a*) may use an interlaced PSFCH format (e.g., PF0, PF2, and/or any other suitable format).

In some cases, UE 402 may select PSFCH resources for COT maintenance signal 610*a* and/or COT maintenance signal 622*a* from a reserved set of PSFCH resources (e.g., reserved set of PSFCH resources may be excluded from PSFCH resource pool). In some configurations, the reserved set of PSFCH resources may include a reserved cyclic shift and a reserved PSFCH RB or PSFCH interlace from a PSFCH group. In some examples, UE 402 may select (e.g., randomly) the PSFCH RB group or PSFCH interlace from the reserved set of PSFCH resources. In some cases, UE 402 may select a fixed or predetermined PSFCH RB or PSFCH interlace (e.g., based on UE parameters or settings).

In some aspects, PSFCH instance 610 and/or PSFCH instance 622 may include one or more PSFCH transmissions from other UEs. For example, a PSFCH instance may be shared among the COT initiating UE (e.g., UE 402) and one or more receiving UEs that are transmitting HARQ feedback (e.g., UE 404, UE 406, and/or UE 408). In some examples, PSFCH instance 610 may include PSFCH 610*b* (e.g., HARQ feedback from UE 404 to UE 402). In some cases, PSFCH instance 610 may also include PSFCH 610*c* (e.g., UE 408 may share COT 602 to send HARQ feedback to UE 406).

In some cases, COT maintenance signal 610*a*, PSFCH 610*b*, and PSFCH 610*c* may be aligned in the time domain (e.g., have same starting time/position). In some examples, aligning transmission of signals within PSFCH instance 610 may avoid LBT blocking among the UEs (e.g., COT maintenance signal 610*a* may block PSFCH 610*b* and/or PSFCH 610*c* based on LBT protocol if the signals are not transmitted at or near the same time).

In some aspects, UE 402 may transmit one or more parameters associated with COT maintenance signal 610*a* to UE 404, UE 406, and/or UE 408. For example, UE 402 may transmit an LBT type, one or more CPE parameters, a priority class, a COT duration, a COT start time, a resource block (RB) set bitmap, any combination thereof, and/or any other parameter associated with COT maintenance signal 610*a*. In some examples, the one or more parameters may be included in first stage sidelink control information (SCI-1) included in physical sidelink control channel (PSCCH) and/or in second stage SCI (SCI-2) included in physical sidelink shared channel (PSSCH). For example, the PSSCH scheduling SCI-2 may include the LBT type, the CPE parameters, and the priority class of CAT-1 LBT for PSFCH 610*b*. In one illustrative example, UE 402 may instruct UE 404 to use CAT-2 LBT (e.g., type A/B/C) with CPE to close gap 612*b* to 16 µs or 25 µs when PSFCH instance 610 is within COT 602 (e.g., based on K1 timeline). In another example, UE 402 may instruct UE 404 to use CAT-1 LBT with lowest priority value and a full symbol gap (e.g., gap 612*b*) when the PSFCH is outside of COT 602 (not illustrated).

In some cases, the one or more parameters may be included in COT system information (COT-SI). In some configurations, COT-SI may be included in SCI-1 and/or SCI-2 for COT sharing (e.g., with UE 406 and/or UE 408). In some aspects, UE 408 may update parameters for COT sharing based on the COT-SI (e.g., initial parameters based on UE 406 scheduling SCI are updated based on COT-SI from UE 402). In some examples, UE 402 may broadcast COT-SI to all sidelink nodes (e.g., all UEs) including targeted receiving UEs (e.g., UE 404) and non-target receivers (e.g., UE 406 and/or UE 408).

In some aspects, UE 402 may use the same or different parameters for one or more PSFCH instances. For example, PSFCH instance 610 and PSFCH instance 622 may use the same parameters (e.g., LBT type, CPE parameters, etc.). In some examples, UE 402 may configure in-COT PSFCH instances with different parameters. In some cases, PSFCH instances that occur in a COT region corresponding to a data burst may be configured with different parameters than PSFCH instances that occur in a remaining time-division multiplexing (TDM) COT region (e.g., after a long data burst). For example, UE 402 may configure signal parameters corresponding to PSFCH instance 610 (e.g., within a data burst) to use type 1C-LBT with a 16 µs gap (e.g., gap 612*a*, gap 612*b*, and gap 612*c*) to avoid additional LBT during the long data burst. In another example, UE 402 may configure signal parameters corresponding to PSFCH instance 622 (e.g., after long data burst) to use type 2A-LBT with a 25 µs gap (e.g., gap 624*a* associated with COT maintenance signal 622*a* and gap 624*b* associated with PSFCH 622*b*) so that one or more receiving UEs (e.g., UE 604, UE 606, and/or UE 608) may share COT 602 for PSFCH transmission. In some aspects, SCI may be used to identify or indicate different COT regions (e.g., start/end of COT regions corresponding to data burst and/or start/end of remaining COT region).

In some examples, the one or more parameters corresponding to PSFCH instances (e.g., PSFCH instance 610 and/or PSFCH instance 622) may be configured using radio resource control (RRC). In some cases, the COT-SI may be used to indicate the start of the remaining COT (e.g., start of slot n+8). In some aspects, the COT-SI may include CPE parameters that may be used to align the PSFCH transmission starting times among non-target receivers (e.g., UE 406 and UE 408), target receivers (e.g., UE 404), and a COT initiator (e.g., UE 402).

In some configurations, a non-target receiver (e.g., UE 406 and/or UE 408) may monitor the sidelink transmissions from UE 402 (e.g., COT initiator) to UE 404 (e.g., target receiver). In some examples, the non-target receiver may use the SCI (e.g., SCI-1 and/or SCI-2) from UE 402 to determine one or more parameters (e.g., the PSSCH scheduling SCI may be used to determine LBT and/or CPE parameters). In some cases, the non-target receiver may determine duration of COT 602 from COT-SI.

Figure 7:
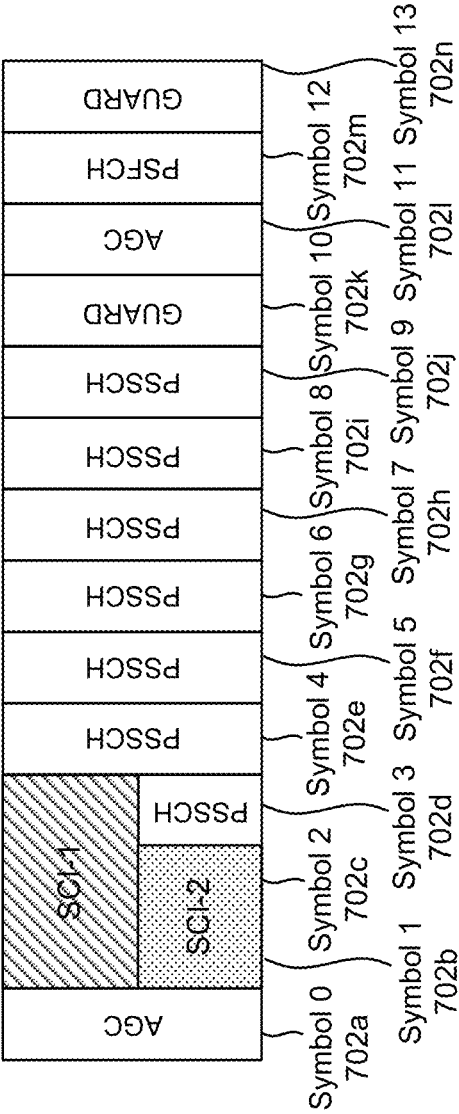
FIG. 7 is a diagram illustrating an example slot in sidelink communication, according to aspects of the disclosure.

FIG. 7 is a diagram illustrating an example slot 700 in sidelink communication. In some aspects, slot 700 may correspond to a slot that includes a PSFCH instance. For example, slot 700 may correspond to slot n+3 or slot n+7 from FIG. 6. In some cases, slot 700 may include 14 symbols (e.g., symbol 0 702*a* to symbol 13 702*n*). In some configurations, slot 700 may include 13 symbols (not illustrated).

In some examples, first stage sidelink control information (SCI-1) may be included in a physical sidelink control channel (PSCCH) transmitted across three symbols (e.g., symbol 1 702*b* to symbol 3 702*d*). In some cases, second stage SCI (SCI-2) may be included in a physical sidelink shared channel (PSSCH) transmitted across two symbols (e.g., symbol 1 702*b* to symbol 2 702*c*). In some cases, the last three symbols in slot 700 (e.g., symbol 11 7021 to symbol 13 702*n*) may include an automatic gain control (AGC) symbol, a PSFCH symbol, and a guard or gap symbol. In some examples, symbol 11 7021 to symbol 13 702*n* may correspond to AGC symbols 502, PSFCH symbols 504, and gap symbols 506, respectively.

FIG. 8 is a flowchart diagram illustrating an example of a process 800 for maintaining channel occupancy time (COT) in sidelink communication. At block 802, the process 800 includes determining, at a first user equipment (UE), that one or more physical sidelink feedback channel (PSFCH) instances are scheduled during a channel occupancy time (COT) corresponding to a sidelink transmission by the first UE to a second UE. For example, UE 402 may determine that PSFCH instance 610 and/or PSFCH instance 622 are scheduled during COT 602 corresponding to a sidelink transmission by UE 402 to UE 404.

At block 804, the process 800 includes transmitting a COT maintenance signal during the one or more PSFCH instances, wherein at least one PSFCH symbol in the COT maintenance signal has a cyclic prefix extension. For instance, UE 402 may transmit COT maintenance signal 610*a* during PSFCH instance 610. In some cases, UE 402 may use cyclic prefix extension to extend a PSFCH symbol in COT maintenance signal 610*a* (e.g., to reduce gap 612*a*). In some examples, the COT maintenance signal may correspond to a PSFCH transmission that includes feedback information associated with a sidelink reception received from the second UE. For example, COT maintenance signal 610*a* may include HARQ feedback information corresponding to a sidelink reception received by UE 402 from UE 404.

In some cases, the process 800 may include determining, at the first UE, that there is no feedback for transmission during the one or more PSFCH instances. For instance, UE 402 may determine that UE 402 does not have any HARQ feedback to transmit during PSFCH instance 610 and/or PSFCH instance 622. In some cases, the COT maintenance signal is transmitted using one or more PSFCH resources that are selected based on a transmitter identifier (ID) associated with the first UE, based on determining that there is no feedback for transmission. For example, UE 402 may transmit COT maintenance signal 610*a* using PSFCH resources that are identified based on a transmitter ID that is associated with UE 402. In some cases, the COT maintenance signal is transmitted using one or more reserved PSFCH resources, based on determining that there is no feedback for transmission. For example, UE 402 may transmit COT maintenance signal 610*a* using one or more reserved PSFCH resources (e.g., a PSFCH resource block group, a PSFCH interlace, etc.).

In some aspects, the process 800 may include transmitting sidelink control information (SCI) that includes at least one of a listen-before-talk (LBT) type, a cyclic prefix extension (CPE) parameter, and a priority class. For instance, UE 402 may transmit sidelink control information that includes at least one of a LBT type, a CPE parameter, and a priority class. In some examples, the process 800 may include transmitting COT system information (COT-SI) that includes one or more parameters associated with the one or more PSFCH instances, wherein the one or more parameters include at least one of a listen-before-talk (LBT) type and a cyclic prefix extension (CPE) parameter. For example, UE 402 may transmit or broadcast COT-SI to UE 404, UE 406, and/or UE 408. In some cases, the COT-SI may include an LBT type or a CPE parameter. In some cases, the receiving UE (e.g., UE 404, UE 406, and/or UE 408) may use the COT-SI to align a PSFCH signal (e.g., PSFCH 610*b*) with COT maintenance signal 610*a*.

In some examples, the one or more parameters may correspond to each of the one or more PSFCH instances. For example, the one or more parameters may correspond to PSFCH instance 610 and PSFCH instance 622. In some cases, the one or more parameters may include a first set of parameters and a second set of parameters, wherein the first set of parameters may correspond to a first instance of the one or more PSFCH instances and the second set of parameters may correspond to a second instance of the one or more PSFCH instances. For example, the first set of parameters may correspond to PSFCH instance 610 and the second set of parameters may correspond to PSFCH instance 622.

In some cases, the process 800 may include receiving, from the second UE, a PSFCH signal during at least one PSFCH instance of the one or more PSFCH instances scheduled during the COT. For example, UE 604 may transmit PSFCH 610*b* during PSFCH instance 610. In some cases, PSFCH 610*b* may include HARQ feedback corresponding to a prior sidelink transmission from UE 402 to UE 404.

FIG. 9 is a flowchart diagram illustrating an example of a process 900 for maintaining channel occupancy time (COT) in sidelink communication. At block 902, the process 900 includes receiving, at a user equipment (UE), one or more parameters associated with one or more physical sidelink feedback channel (PSFCH) instances scheduled during a channel occupancy time (COT) corresponding to a first transmitting user equipment (UE). For example, UE 408 may receive one or more parameters from UE 402 that are associated with PSFCH instance 610 scheduled during COT 602 corresponding to UE 402.

In some cases, the one or more parameters include at least one of a listen-before-talk (LBT) type, a cyclic prefix extension (CPE) parameter, a COT duration, and a COT start time. For instance, UE 408 may receive parameters associated with PSFCH instance 610 from UE 402. In some aspects, the one or more parameters (e.g., LBT type, CPE parameter, COT duration, COT start time, etc.) may be used by UE 408 to align PSFCH 610*c* with COT maintenance signal 610*a*. In some examples, the one or more parameters may be included in sidelink control information (SCI) transmitted by the first transmitting UE. For instance, the one or more parameters may be included in SCI-1 and/or SCI-2 transmitted by UE 402. In some aspects, the one or more parameters are received using a radio resource control (RRC) protocol. For example, UE 408 may receive the one or more parameters using an RRC protocol.

At block 904, the process 900 includes receiving a sidelink transmission from a second transmitting UE. For instance, UE 408 may receive a sidelink transmission from UE 406.

At block 906, the process 900 includes transmitting feedback corresponding to the sidelink transmission to the second transmitting UE during at least one PSFCH instance of the one or more PSFCH instances scheduled during the COT corresponding to the first transmitting UE. For example, UE 408 may transmit HARQ feedback corresponding to the sidelink transmission from UE 406 during PSFCH instance 610 (e.g., sharing COT 602 by transmitting PSFCH 610*c*). In some examples, the feedback may include at least one of an acknowledgment (ACK), a negative acknowledgment (NACK), and a channel state information (CSI) report. For example, UE 408 may transmit an ACK, NACK, and/or a CSI report using PSFCH 610*c*.

In some examples, the processes described herein (e.g., process 800, process 900, and/or other process described herein) may be performed by a computing device or apparatus (e.g., a UE, a base station, etc.). In one example, the processes 800 and/or 900 may be performed by a wireless communication device, such as a UE (e.g., UE 307). In another example, the processes 800 and/or 900 may be performed by a computing device with the computing system 1000 shown in FIG. 10. For instance, a wireless communication device (e.g., the UE 402 of FIG. 4, mobile device, and/or other UE or device) with the computing architecture shown in FIG. 10 may include the components of the UE and may implement the operations of FIG. 8 and/or FIG. 9.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes 800 and 900 are illustrated as logical flow diagrams, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 800, process 900, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
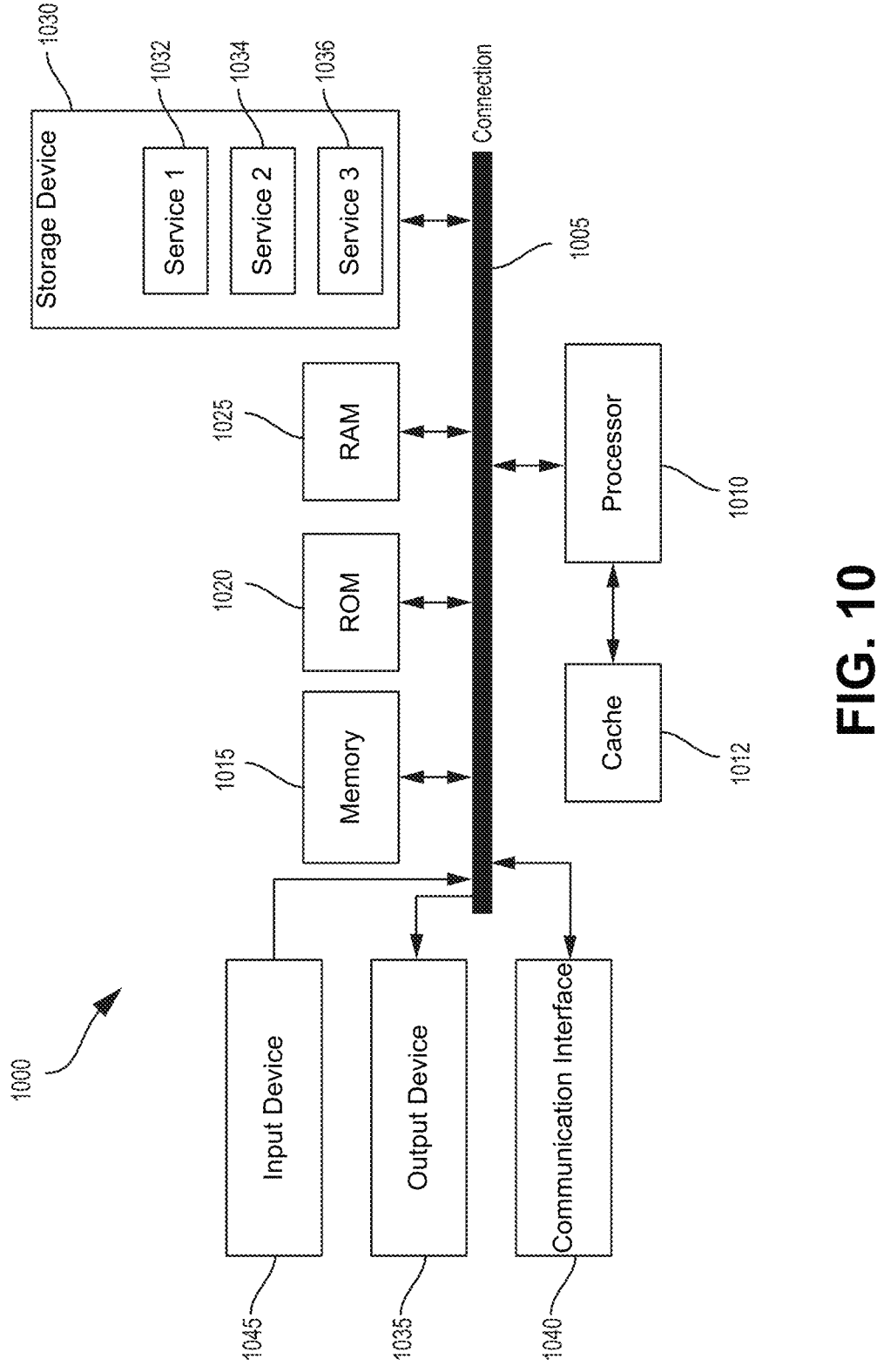
FIG. 10 is a block diagram illustrating an example of a computing system, according to aspects of the disclosure.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some embodiments, computing system 1000 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 may include a cache 1012 of high-speed memory connected directly with, in close proximity to, or integrated as part of processor 1010.

Processor 1010 may include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EE-PROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some embodiments, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative examples of the disclosure include:

Aspect 1. Aspect 1. A method for wireless communications, comprising: determining, at a first user equipment (UE), that one or more physical sidelink feedback channel (PSFCH) instances are scheduled during a channel occupancy time (COT) corresponding to a sidelink transmission by the first UE to a second UE; and transmitting a COT maintenance signal during the one or more PSFCH instances, wherein at least one PSFCH symbol in the COT maintenance signal has a cyclic prefix extension.

Aspect 2. The method of Aspect 1, wherein the COT maintenance signal corresponds to a PSFCH transmission that includes feedback information associated with a sidelink reception received from the second UE.

Aspect 3. The method of any of Aspects 1 to 2, further comprising: determining, at the first UE, that there is no feedback for transmission during the one or more PSFCH instances.

Aspect 4. The method of Aspect 3, wherein the COT maintenance signal is transmitted using one or more PSFCH resources that are selected based on a transmitter identifier (ID) associated with the first UE, based on determining that there is no feedback for transmission.

Aspect 5. The method of Aspect 3, wherein the COT maintenance signal is transmitted using one or more reserved PSFCH resources, based on determining that there is no feedback for transmission.

Aspect 6. The method of any of Aspects 1 to 5, further comprising: transmitting sidelink control information (SCI) that includes at least one of a listen-before-talk (LBT) type, a cyclic prefix extension (CPE) parameter, and a priority class.

Aspect 7. The method of any of Aspects 1 to 6, further comprising: transmitting COT system information (COT-SI) that includes one or more parameters associated with the one or more PSFCH instances, wherein the one or more parameters include at least one of a listen-before-talk (LBT) type and a cyclic prefix extension (CPE) parameter.

Aspect 8. The method of Aspect 7, wherein the one or more parameters correspond to each of the one or more PSFCH instances.

Aspect 9. The method of Aspect 7, wherein the one or more parameters include a first set of parameters and a second set of parameters, wherein the first set of parameters correspond to a first instance of the one or more PSFCH instances and the second set of parameters correspond to a second instance of the one or more PSFCH instances.

Aspect 10. The method of any of Aspects 1 to 9, further comprising: receiving, from the second UE, a PSFCH signal during at least one PSFCH instance of the one or more PSFCH instances scheduled during the COT.

Aspect 11. An apparatus for wireless communications, comprising: at least one memory; at least one transceiver; and at least one processor coupled to the at least one transceiver and the at least one memory, wherein the at least one processor is configured to perform operations in accordance with any one of Aspects 1 to 10.

Aspect 12. An apparatus for wireless communications, comprising means for performing operations in accordance with any one of Aspects 1 to 10.

Aspect 13. A non-transitory computer-readable medium comprising instructions that, when executed by an apparatus, cause the apparatus to perform operations in accordance with any one of Aspects 1 to 10.

Aspect 14. A method for wireless communications, comprising: receiving, at a user equipment (UE), one or more parameters associated with one or more physical sidelink feedback channel (PSFCH) instances scheduled during a channel occupancy time (COT) corresponding to a first transmitting user equipment (UE); receiving a sidelink transmission from a second transmitting UE; and transmitting feedback corresponding to the sidelink transmission to the second transmitting UE during at least one PSFCH instance of the one or more PSFCH instances scheduled during the COT corresponding to the first transmitting UE.

Aspect 15. The method of Aspect 14, wherein the one or more parameters include at least one of a listen-before-talk (LBT) type, a cyclic prefix extension (CPE) parameter, a COT duration, and a COT start time.

Aspect 16. The method of any of Aspects 14 to 15, wherein the one or more parameters are included in sidelink control information (SCI) transmitted by the first transmitting UE.

Aspect 17. The method of any of Aspects 14 to 16, wherein the one or more parameters are received using a radio resource control (RRC) protocol.

Aspect 18. The method of any of Aspects 14 to 17, wherein the feedback includes at least one of an acknowledgment (ACK), a negative acknowledgment (NACK), and a channel state information (CSI) report.

Aspect 19. An apparatus for wireless communications, comprising: at least one memory; at least one transceiver; and at least one processor coupled to the at least one transceiver and the at least one memory, wherein the at least one processor is configured to perform operations in accordance with any one of Aspects 14 to 18.

Aspect 20. An apparatus for wireless communications, comprising means for performing operations in accordance with any one of Aspects 14 to 18.

Aspect 21. A non-transitory computer-readable medium comprising instructions that, when executed by an apparatus, cause the apparatus to perform operations in accordance with any one of Aspects 14 to 18.

What is claimed is:

1. A method for wireless communications, comprising:

determining, at a first user equipment (UE), that one or more physical sidelink feedback channel (PSFCH) instances are scheduled for the first UE during a channel occupancy time (COT) corresponding to a sidelink transmission by the first UE to a second UE;

determining, at the first UE, that there is no feedback for transmission by the first UE during the one or more PSFCH instances scheduled for the first UE during the COT corresponding to the sidelink transmission by the first UE to the second UE; and in response to determining there is no feedback for transmission by the first UE during the one or more PSFCH instances, transmitting a COT maintenance signal during the one or more PSFCH instances scheduled for the first UE, wherein a transmission gap within at least one PSFCH symbol in the COT maintenance signal is filled using a cyclic prefix extension of the at least one PSFCH symbol in the COT maintenance signal.

2. The method of claim 1, wherein the COT maintenance signal is transmitted using one or more PSFCH resources that are selected based on a transmitter identifier (ID) associated with the first UE, based on determining that there is no feedback for transmission.

3. The method of claim 1, wherein the COT maintenance signal is transmitted using one or more reserved PSFCH resources, based on determining that there is no feedback for transmission.

4. The method of claim 3, wherein the one or more reserved PSFCH resources are excluded from a PSFCH resource pool.

5. The method of claim 4, wherein the PSFCH resource pool is configured by a network device.

6. The method of claim 1, further comprising:
transmitting sidelink control information (SCI) that includes at least one of a listen-before-talk (LBT) type, a cyclic prefix extension (CPE) parameter, or a priority class.

7. The method of claim 1, further comprising:
transmitting COT system information (COT-SI) that includes one or more parameters associated with the one or more PSFCH instances, wherein the one or more parameters include at least one of a listen-before-talk (LBT) type or a cyclic prefix extension (CPE) parameter.

8. The method of claim 7, wherein the one or more parameters correspond to each of the one or more PSFCH instances.

9. The method of claim 7, wherein the one or more parameters include a first set of parameters and a second set of parameters, wherein the first set of parameters correspond to a first instance of the one or more PSFCH instances and the second set of parameters correspond to a second instance of the one or more PSFCH instances.

10. The method of claim 1, further comprising:
receiving, from the second UE, a PSFCH signal during at least one PSFCH instance of the one or more PSFCH instances scheduled during the COT.

11. The method of claim 1, wherein the cyclic prefix extension in the at least one PSFCH symbol reduces the transmission gap within the at least one PSFCH symbol to less than a channel idle threshold time for accessing the PSFCH without performing listen-before-talk (LBT).

12. The method of claim 11, wherein the channel idle threshold time includes 16 microseconds or 25 microseconds.

13. An apparatus for wireless communications, comprising:
at least one memory;
at least one transceiver; and
at least one processor coupled to the at least one transceiver and the at least one memory, wherein the at least one processor is configured to:
determine that one or more physical sidelink feedback channel (PSFCH) instances are scheduled for the apparatus during a channel occupancy time (COT) corresponding to a sidelink transmission by the apparatus to a user equipment (UE);

determine that there is no feedback for transmission by the apparatus during the one or more PSFCH instances scheduled for the apparatus during the COT corresponding to the sidelink transmission by the apparatus to the UE; and
in response to a determination that there is no feedback for transmission by the apparatus during the one or more PSFCH instances scheduled for the apparatus, transmit, via the at least one transceiver, a COT maintenance signal during the one or more PSFCH instances, wherein a transmission gap within at least one PSFCH symbol in the COT maintenance signal is filled using a cyclic prefix extension of the at least one PSFCH symbol in the COT maintenance signal.

14. The apparatus of claim 13, wherein the COT maintenance signal is transmitted using one or more PSFCH resources that are selected based on a transmitter identifier (ID) associated with the apparatus.

15. The apparatus of claim 13, wherein the COT maintenance signal is transmitted using one or more reserved PSFCH resources.

16. The apparatus of claim 15, wherein the one or more reserved PSFCH resources are excluded from a PSFCH resource pool.

17. The apparatus of claim 16, wherein the PSFCH resource pool is configured by a network device.

18. The apparatus of claim 13, wherein the at least one processor is further configured to:
transmit, via the at least one transceiver, sidelink control information (SCI) that includes at least one of a listen-before-talk (LBT) type, a cyclic prefix extension (CPE) parameter, or a priority class.

19. The apparatus of claim 13, wherein the at least one processor is further configured to:
transmit, via the at least one transceiver, COT system information (COT-SI) that includes one or more parameters associated with the one or more PSFCH instances, wherein the one or more parameters include at least one of a listen-before-talk (LBT) type or a cyclic prefix extension (CPE) parameter.

20. The apparatus of claim 19, wherein the one or more parameters correspond to each of the one or more PSFCH instances.

21. The apparatus of claim 19, wherein the one or more parameters include a first set of parameters and a second set of parameters, wherein the first set of parameters correspond to a first instance of the one or more PSFCH instances and the second set of parameters correspond to a second instance of the one or more PSFCH instances.

22. The apparatus of claim 13, wherein the at least one processor is further configured to:
receive, via the at least one transceiver from the UE, a PSFCH signal during at least one PSFCH instance of the one or more PSFCH instances scheduled during the COT.

23. The apparatus of claim 13, wherein the cyclic prefix extension in the at least one PSFCH symbol reduces the transmission gap within the at least one PSFCH symbol to less than a channel idle threshold time for accessing the PSFCH without performing listen-before-talk (LBT).

24. The apparatus of claim 23, wherein the channel idle threshold time includes 16 microseconds or 25 microseconds.

* * * * *